Figure 1:
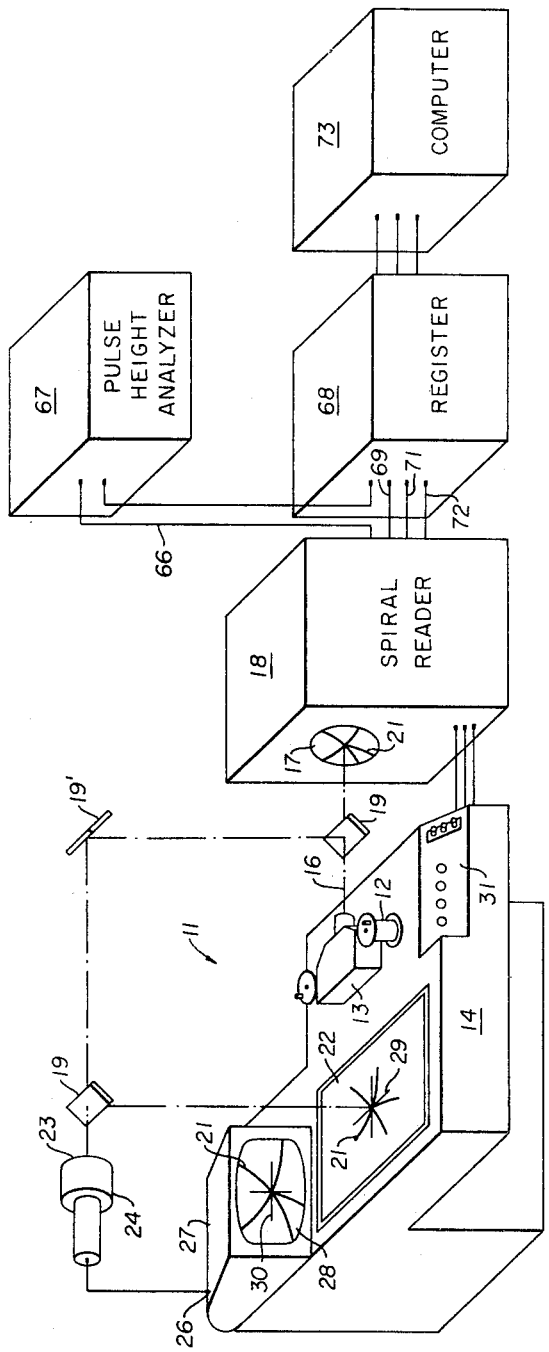

United States Patent Office 3,421,010
Patented Jan. 7, 1969

3,421,010
SPIRAL SCANNING SYSTEM EMPLOYING ROTARY AND RECIPROCATING MIRRORS FOR AUTOMATIC DATA MEASURING PROJECTORS
Fred L. Toby, Berkeley, Calif., assignor to the United States of America as represented by the United States Atomic Energy Commission
Filed Jan. 26, 1966, Ser. No. 523,514
U.S. Cl. 250—219      6 Claims
Int. Cl. G01n 21/30; H01j 3/16

The present invention relates to automatic data measuring projectors of the type used for analyzing filmed interactions between nuclear particles and the like. More particularly, the invention relates to a novel scanning mechanism for such a projector which provides certain distinct advantages in the automatic analysis of some forms of such data.

The invention described herein was made in the course of, or under, Contract W-7405-eng-48 with the United States Atomic Energy Commission.

The intensive use of bubble chamber detectors in nuclear physics research produces filmed data of nuclear particle events at an enormous rate. The various types of these particle events and interactions each have their own characteristic topological forms of track pattern by which they are identified on the film. The films are initially reviewed by human operators who designate the track combinations which are to be measured, according to the interests of the particular experiment. Subsequently a scanning-measuring technician selects these event tracks from the numerous extraneous background features on the film as he directs the operation of a measuring projector to define the desired track locations with respect to fixed reference marks. An example of such a measuring projector is disclosed in U.S. Patent No. 2,895,053 entitled Measuring Projector, issued July 14, 1959.

A very prevalent form of nuclear event which appears on the film is the single-vertex, or star-type, interaction wherein several tracks branch out from a single interaction. Measurement of these multi-branched event patterns by the typical scanning projectors, which are the path-tracking type, is very time-consuming. As these machines have become more sophisticated, providing improved measuring accuracies and data validity rates, they have also become very costly to construct and expensive to operate. Thus, economic considerations often dictate a rather selective usage of the scanning facilities and the projector time may be first allocated to measurement of the more rare and exotic nuclear events. These events can appear in sufficient quantities however, to saturate the machine time scheduling. Consequently, measurement of the star-type events is often neglected and the valuable and readily available information from these commonly occurring interactions is lost.

The subject invention provides a novel scanning system for use with a measuring projector which, by virtue of a spiral scanning pattern, is particularly adapted to the study of star-type events. The operation and construction costs of the device are sufficiently low to make feasible the installation of separate machines for the sole purpose of measuring star-type events, and the measuring technique is sufficiently automatic that the high scanning rate per operator-hour justifies the examination of all filmed data for these events.

The scanning head of the apparatus includes two mirrors arranged in periscope-like fashion to view a projected image of the film. A first large mirror of the periscope includes an entire segment of the circular area of the image to be spirally scanned. A second mirror, much smaller than the first and the image area of which defines the scanning increment, views the reflected image from the first mirror. The second mirror is translatable along its own axis of reflection whereby it scans a path along the radius of the segment of image reflected by the first mirror. Rotating the periscope about the second axis of reflection in combination with a simultaneous outward directed translation of the second mirror thereby produces a spiral scanning path.

The periscope is manually centered at the vertex of the particular star event image of interest. Upon rotation, the scanning element traces a spiral path outward from the vertex whereby each track or marking having an essentially radial orientation with respect thereto will be crossed several times at progressively outward locations thereon. Each such crossing is detected photoelectrically and is automatically registered with the respective coordinate locations of the scanned points on the tracks or on other extraneous markings. All discrimination of the valid track locations among the data so recorded occurs in subsequent computer operations wherein the nuclear event is reconstructed and points which do not described a continuous curve emanating from the event vertex are eliminated.

The spiral scanning pattern allows the burden of valid data discrimination to be placed entirely on the analysing components rather than the data detection elements. Thus, less cost and complexity is required in the scanning apparatus and operation, and better use is made of the already available computer installations.

Accordingly, a first object of the invention is to provide a film scanning device having a spiral scanning pattern.

A further object of the invention is to provide a scanning-measuring projector for filmed data of single-vertex nuclear events which does not require tracing of the multibranch particle paths.

It is another object of the invention to provide a film scanning device having means for automatic measurement of nuclear data recorded thereon, the validity of which measurements may be subsequently determined by computer.

A further object of the invention is to provide a film scanning and data measuring projector requiring a minimum of guidance by the operator.

Figure 2:
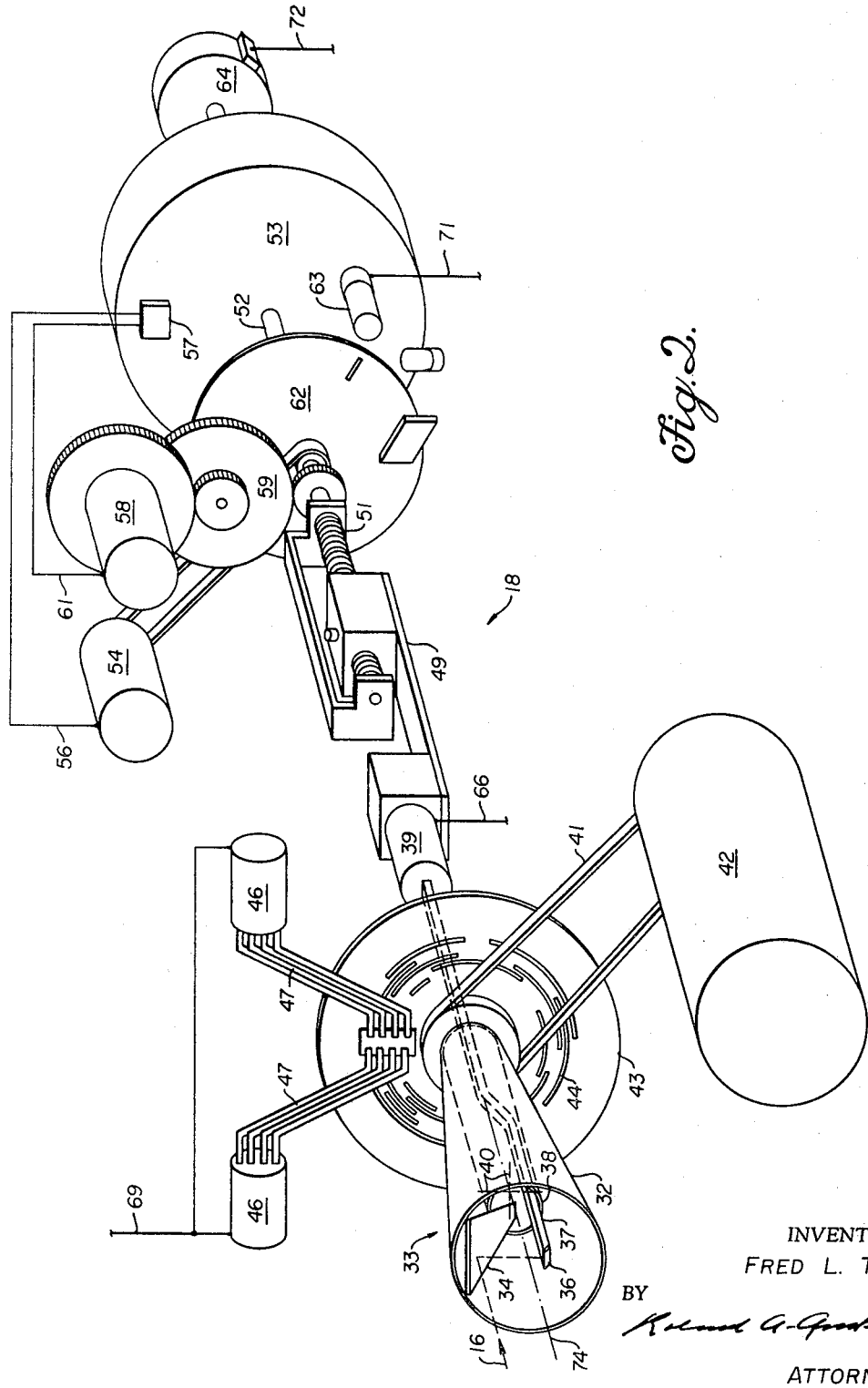

The invention will be best understood with reference to the following specification taken in conjunction with the accompanying drawing of which:

FIGURE 1 is a schematic perspective view of the salient components of the measuring projector, and FIGURE 2 is a perspective view showing the spiral reader scanning mechanism of the apparatus of FIGURE 1.

Referring now to the drawing and more particularly to FIGURE 1 thereof, there is shown a scanning station 11 at which the bubble chamber film is examined by a scanning technician. The film reel 12 is loaded in a conventional projection device 13 adjustably mounted on a scanning table 14. The image beam 16 from the projector 13 is directed away from table 14 toward the periscope window 17 of a spiral reader scanning system 18 disposed beside the scanning station 11. This projection of the film image is split by the first of a system of half and full-silvered mirrors 19 and 19' respectively, whereby a nuclear event pattern 21 from the film is redirected and simultaneously displayed on the viewing surface 22 of the scanning table 14 and on the tube face 23 of an image orthicon 24. The image orthicon 24 is coupled to the beam deflection controls 26 of a television monitor 27 whereby an enlargement of the central vertex portion of the event pattern 21 is portrayed on a television screen 28 situated adjacent to the viewing surface 22.

Thus, as the film 12 is advanced through the projector 13, the nuclear particle paths recorded thereon are displayed on the viewing screen 22 of the scanning table 14. Upon observing a single-vertex event to be measured, the scanning technician adjusts the vertical positioning of the projector 13 and the horizontal translation of the film 12 frame in the projector to center the event image 21 on cross hairs 29 of the scanning table screen 22. Fine positioning of the pattern is aided by centering the enlarged image on the vertex on the cross hairs 30 of the television screen 28. This positioning correspondingly centers the event image 21 on the periscope window 17 of the spiral reader 18 whereupon automatic spiral scanning of the event image and recording of the multi-branch track locations is initiated from a control panel 31 of scanning table 14.

Referring now to FIGURE 2, there is shown the internal mechanism of the spiral reader 18. The larger end of a conical hood 32 defines the scanning area of the periscope window 17 of FIGURE 1. The periscope 33 comprises a first large trapezoidal mirror 34 secured within hood 32 and facing the oncoming image 16 at a 45° angle to intercept an annular sector of the circular area to be scanned. A second, smaller rectangular mirror 36 is disposed to face mirror 34, in parallel relationship thereto, and is mounted in the hood 32 at the end of a long slender light channel 37. The large mirror 34 is rigidly secured to conical hood 32 and to a shorter inner tube 38 concentric therewith. The light channel 37 is disposed within the tube 38 and is longitudinally slidable therein whereby the small mirror 36 may be translated in a direction normal to the light path between the two mirrors to intercept a constantly changing portions of the reflection from large mirror 34. Thus, a combined rotation of the periscope 33 and longitudinal translation of the light channel 37 will cause the small mirror 36 to scan a spiral path over the image, which is focussed at the image plane indicated by the broken lines 40. The light channel 37 extends rearward from periscope 33 to the face of a photomultiplier tube 39 whereby the appearance of a track or marking in the image segment seen by small mirror 36 is indicated by a change in output response from the tube 39.

The periscope assembly 33 is rotated by means of a belt drive 41 coupled to a small motor 42. A disc encoder 43 of the Baldwin type is provided with a pattern of light-transmissive position-indicating slits 44 and is disposed behind periscope 33 to rotate therewith. A pair of photomultiplier tubes 46 and associated light pipes 47 are stationed to respond to light transmitted by the slit 44 pattern of the disc 43 to provide signal information of the instantaneous angular position of the periscope 33.

The image track-detecting photomultiplier tube 39 is mounted on one end of a carriage 49. The opposite end of the carriage 49 travels on a lead screw 51 whereby the light channel 37 is translated longitudinally within the inner periscope tube 38 and the small mirror 36 acquires the previously described radial motion with respect to large mirror 34. The juxtaposition of the end of light channel 37 and the face of the phototube 39 provides for the rotation of the light channel with the periscope assembly while the phototube and carriage 49 can move in a longitudinal direction only.

The lead screw 51 is driven by direct shaft coupling 52 to a reversible servomotor 53 disposed therebehind. A tachometer generator 54, belt driven from shaft 52, has an output 56 coupled to the feedback input 57 of the motor 53 for servo speed control. A potentiometer-type turns counter 58, driven by gear linkage 59 from shaft 52, also has an output 61 coupled to the servo input 57 to control the motor 53 direction and thus serves to periodically reverse the travel of light channel 37. Signal information on the lead screw rotation, and thus on the radial displacement of the image from small periscope mirror 36, is provided by a diode disc 62 and photocell 63 arrangement for a completed turns index and by an encoder disc 64 to indicate fractional turns of the screw 51.

Referring again to FIGURE 1 in conjunction with FIGURE 2, there is shown the output channel 66 of the track-detecting phototube 39, coupled through a pulse height analyzer 67 to a data register 68, suitable data storage devices being known to the art. The outputs 69, 71, and 72 of the periscope position-indicating photomultiplier tubes 46, the diode disc photocell 63, and the encoder disc 64, respectively, are also coupled to the register 68. Upon the occurrence of a particle track signal from pulse height analyzer 67, the instantaneous position-indicating signals are accepted by the register for subsequent read-out to a computer 73. Computer 73, using techniques known to the art, is utilized to reconstruct the configuration of the filmed event from the coordinate data and to perform such analyses of the data as may be required Thus, in operation, the vertex of the star-type event image 21 is centered on the rotational axis 74 of the periscope 33 and the small mirror 36 is started at the fully retracted position of light channel 37. Upon rotation of the periscope 33, as actuated from control panel 31, the small mirror 36 will scan an outwardly spiraling path over the image 21. Each time a branch track or any extraneous marking is crossed in the scanning, the location is automatically recorded in register 68. All such events of the film reel are similarly scanned and the data therefrom is accummulated in the register 68. In subsequent operations the computer 73 reconstructs the events from the registered data and may be programmed to eliminate those points which do not fall along a smooth curve from the vertex of each pattern.

The device provides for very rapid review and scanning of the film. Aside from operating the controls 31, the attention of the scanning operator is required only for centering the patterns chosen to be recorded. No operator-controlled track-tracing or guidance is required. Also, as the appaartus includes no costly high-precision tracking means, it is a relatively inexpensive installation.

It will be apparent that variations and modifications are possible within the scope of the invention and thus it is not intended to limit the invention except as defined in the following claims.

What is claimed is:

1. Apparatus for use in conjunction with a computer in scanning and measuring the particle tracks of single-vertex type nuclear events in filmed bubble chamber data comprising, in combination, a film projector for projecting an image which contains the single-vertex event track to be measured, a scanning periscope disposed to view said image, said scanning periscope having a rotating image viewing element comprising a first mirror viewing said image and being provided with a second mirror for viewing the reflected image from said first mirror, means for translating one of said first and second mirrors of said periscope with respect to the other along the mutual optical axis thereof whereby said periscope traces a path across a radial portion of said image for tracing a spiral scanning path centered on said single-vertex event on said image, position indicating means responsive to the instantaneous position of said periscope along said spiral scanning path, a photoelectric element disposed to receive the light from said image which is transmitted from said second mirror and producing an output indicative of momentary changes in light intensity due to the presence of an increment of event track in said image, and an information register for receiving data from said position indicating means and from said photoelectric element for subsequent analysis by said computer.

2. Apparatus as described in claim 1 wherein said scanning periscope comprises a first relatively large mirror forming said rotating image viewing element and reflecting a sector of the essentially circular image area which includes said single-vertex track event, a second relatively small mirror reflecting an incremental portion of the image from said first mirror, means rotating said periscope about the axis of reflection of said second mirror, and means selectively translating said second mirror parallel to the axis of reflection thereof whereby said second mirror progressively reflects different radial increments of the image from said first mirror whereby the combined effect of said rotation and said translation is said spiral scanning path.

3. Apparatus as described in claim 1 and comprising the further combination of a light channel disposed between the exit aperture of said scanning periscope and the photocathode of said photoelectric element, and a pulse height analyzer coupled between the output of said photoelectric element and an input of said information register for transmitting only preselected output response levels thereto.

4. Apparatus as described in claim 1 and further comprising image splitting means disposed at the optical path between said projector and said periscope and producing a second and a third image of said film, a scanning table disposed to receive and display said second image of said film for the selection of said single-vertex event tracks therein by an operator, an image orthicon disposed to receive said third image of said film, and a television monitor having the beam intensity control thereof coupled to the output of said image orthicon to produce an enlarged view of said single-vertex event pattern on the screen thereof, the screen of said television monitor having reference cross hairs provided thereon which correspond in position to the geometric center of said spiral scanning path traced by said periscope.

5. Apparatus as described in claim 1 wherein said periscope is comprised of a first mirror inclined with respect to the plane of said image of said projector, a second smaller mirror spaced apart therefrom to reflect a small portion of the image reflected by said first mirror to said photoelectric element, a first reversible motor coupled to said periscope for rotating said first and second mirrors about an axis normal to said plane of said image, a lead screw coupled to said second mirror for translating said second mirror along said axis, and a second reversible motor coupled to said lead screw for effecting said translation of said second mirror.

6. Apparatus as described in claim 5 wherein said position indicating means comprises a first rotation sensing device coupled to said first mirror for producing output signals indicative of the incremental angular position throughout a single revolution of said periscope which signals correspond to the angular polar coordinate along said spiral scanning path, a second rotation sensing device coupled to said lead-screw for producing output signals indicative of the incremental rotation throughout a single turn thereof, and a turns counter coupled to said lead screw for producing output signals indicative of completed turns thereof whereby the combined outputs of said second rotation sensing device and said turns counter correspond to the radial polar coordinate along said spiral scanning path.

References Cited

UNITED STATES PATENTS

| | | | |
|---|---|---|---|
| 2,447,473 | 8/1948 | Finch | 178—7.6 |
| 2,478,555 | 8/1949 | Yule | 178—7.6 |
| 2,838,602 | 6/1958 | Sprick | 250—219 |
| 2,855,521 | 10/1958 | Blackstone | 250—235 |
| 2,912,497 | 11/1959 | Parrott | 178—7.6 |
| 2,995,678 | 8/1961 | Taylor | 178—7.6 |
| 3,068,740 | 12/1962 | Argyle | 250—235 |
| 3,273,446 | 9/1966 | Goetz et al. | 350—6 |
| 3,340,359 | 9/1967 | Fredkin | 250—202 |
| 3,345,120 | 10/1967 | Palmer | 350—6 |
| 3,366,794 | 1/1968 | Alvarez | 250—202 |

RALPH G. NILSON, *Primary Examiner.*

BRUCE L. ADAMS, *Assistant Examiner.*

U.S. Cl. X.R.

250—236; 178—7.6; 350—7